ns were added in dyeing bath:

United States Patent

Nemoto et al.

[11] 3,954,399
[45] May 4, 1976

[54] PROCESS FOR DYEING NITROGEN-CONTAINING FIBERS

[75] Inventors: Yoshio Nemoto, Nagoya; Hiroyuki Funahashi, Komaki; Takeo Miyake, Toyonaka, all of Japan

[73] Assignee: Sumitomo Chemical Company, Limited, Osaka, Japan

[22] Filed: Mar. 26, 1973

[21] Appl. No.: 345,064

[30] Foreign Application Priority Data

Mar. 28, 1972 Japan.................... 47-31461

[52] U.S. Cl............................. 8/54; 8/173; 8/174; 8/179; 8/172 R
[51] Int. Cl.²................................. D06P 5/06
[58] Field of Search............... 8/172, 54, 173, 174, 8/179

[56] References Cited
UNITED STATES PATENTS

| | | | |
|---|---|---|---|
| 1,970,578 | 8/1934 | Schoeller et al. | 260/98 |
| 3,291,556 | 12/1966 | Berger | 8/54 |
| 3,630,663 | 12/1971 | Hildebrand et al. | 8/172 |
| 3,764,262 | 10/1973 | Hildebrand et al. | 8/172 |

*Primary Examiner*—Benjamin R. Padgett
*Assistant Examiner*—B. Hunt
*Attorney, Agent, or Firm*—Stevens, Davis, Miller & Mosher

[57] ABSTRACT

A process for dyeing a nitrogen-containing fiber, which comprises dyeing the fiber in a dye bath containing a halogenated hydrocarbon solvent, and a dye complex of an anionic dye with an amine of the formula: represents

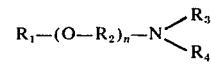

wherein $R_1$ represents a saturated or unsaturated hydrocarbon residue having 8 to 22 carbon atoms, $R_2$ represents a saturated or unsaturated divalent hydrocarbon residue having 2 to 6 carbon atoms, said hydrocarbon residue for $R_1$ and $R_2$ may be of a straight or branched chain, $n$ represents an integer of 1 to 4, each member of $R_2$ may be the same or different when $n$ is 2 or more, $R_3$ and $R_4$ each respresents a hydrogen atom, a lower alkyl or hydroxyalkyl group having 1 to 3 carbon atoms, and $R_3$ and $R_4$ may be the same or different.

10 Claims, No Drawings

PROCESS FOR DYEING NITROGEN-CONTAINING FIBERS

The present invention relates to a process for dyeing nitrogen-containing fibers in a dye bath containing a dye and a halogenated aliphatic hydrocarbon.

More particularly, the present invention relates to a process for dyeing nitrogen-containing fibers characterized in that said fiber is dyed in a dye bath containing a halogenated hydrocarbon solvent, and a complex of an anionic dye with a compound of the following general formula (I):

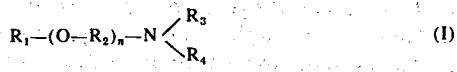
(I)

wherein $R_1$ represents a saturated or unsaturated hydrocarbon residue having 8 to 22 carbon atoms, $R_2$ represents a saturated or unsaturated divalent hydrocarbon residue having 2 to 6 carbon atoms, said hydrocarbon residue for $R_1$ and $R_2$ may be of a straight or branched chain, $n$ represents an integer of 1 to 4, and each member of $R_2$ may be the same or different when $n$ is 2 or more, $R_3$ and $R_4$ each represent a hydrogen atom, a lower alkyl or hydroxyalkyl group having 1 to 3 carbon atoms, and $R_3$ and $R_4$ may be the same or different.

In recent years, from a viewpoint of waste water pollution in the dyeing industry, a dyeing process in which organic solvents are repeatedly employed substantially without employing water, has become the object of major interest in various fields, and particularly halogenated aliphatic hydrocarbons such as trichloroethylene or perchloroethylene are employed as organic solvents, however the process has not yet been satisfactorily perfected.

In those processes, for the purpose of obtaining a desirable dyeing of nitrogen-containing fibers, especially wool and nylon, there are generally employed anionic dyes which have hydrophilic anionic groups such as a sulfonic acid group, however those dyes are quite unsuitable to obtain the level dyeing because they are substantially insoluble in trichloroethylene or perchloroethylene. The inventors have made extensive studies of the process for dyeing polyamide fibers in a dye bath containing a halogenated aliphatic hydrocarbon, such as perchloroethylene, and have found that the use of complexes of anionic dyes with compounds of the general formula (I) as mentioned above are highly effective in dyeing processes.

The adsorption of dissolved dyes into fibers generally proceeds against the affinity of the complex to the solvent, and so the dyeing property thereof depends on the dissolved state of the complex. That is, the higher the affinity to solvent, and the more stable the dyeing system, the greater the need of high temperature treatment, while the lower the affinity to solvent and the less stable the dyeing system, a phase-separation is caused to form a heterogeneous system.

In the former case a degree of exhaustion of the dye on fibers is reduced and in the latter case the dyeing becomes unlevel. Furthermore, in the non-aqueous solvent dyeing process, a small amount of water contained in an organic solvent has a serious effect, and thus a sufficient degree of exhaustion can not be obtained in a short time when the distribution of dye to water is low. On the other hand, an object of the present invention is to provide a method for obtaining good absorption and level dyeing, by forming complexes of anionic dyes with the foregoing amine compounds of the general formula (I), thus obtaining appropriate affinity of the complex to halogenated hydrocarbons and an increased distribution of the complex to water.

The dye complexes of the present invention have an ethereal oxygen atom in a long hydrocarbon chain of amine components constituting dye complexes, and thus have a reduced affinity to solvent and have a higher hydrophilic property compared with the corresponding dye complexes formed from well-known amines containing no ethereal oxygen atom therein, for example, the amines disclosed in French Patent No. 2,019,321, result in an increased distribution thereof to water.

That is, it can be observed that according to the present invention, a high degree of exhaustion and an exhaustion equilibrium in a short time are obtained when the dye complexes of the invention are applied to a solvent dyeing system containing a small amount of water.

Furthermore, it is quite advantageous in a solvent dyeing system containing a small amount of water that amine components of the present invention have at least 10 carbon atoms in the alkyl residue containing an ethereal oxygen atom ($R_1 - (O - R_2)n -$).

In other words, the dye complexes comprising the amines of the invention have a superior feature, compared with the corresponding dye complexes comprising the primary, secondary or tertiary amines containing no ethereal oxygen atom as disclosed in German Patent No. 2,008,638, in the ability to emulsify a small amount of water in solvent, thus the freedom from the hazard of phase-separation and level dyeing is achieved.

The water-soluble anionic dyes of the invention have at least one ionic group such as a carboxylate or sulfonate ion, or a polar group such as a sulfonamide or methylsulfon. As a chromophore of the anionic dyes, any type of chromophore may be employed, for example, azo, anthraquinone, triphenylmethane, phthalocyanine and the like, all of which may contain metals capable of forming a coordinate bond or substituents capable of reacting with nitrogen-containing fibers.

The foregoing compounds of the general formula (I) of the present invention include, for example, γ-octoxypropylamine, β-decyloxyethylamine, β-dodecyloxyethylamine, γ-octadecyloxypropylamine, N,N-dimethyl-β-octoxyethylamine, and γ-(β'-decyloxyethoxy)-propylamine.

In carrying out the present process, the dyeing may be carried out, preferably at a temperature of 80° to 100°C in a liquor ratio of 1 : 10 to 80 in the presence of 0.1 to 5 percent by weight based on the halogenated hydrocarbon solvent of water.

The nitrogen-containing fibers to which the present invention may be applied include natural fibers such as wool or silk and synthetic fibers such as nylon 6, nylon 66 and modified polyester.

In the present process, the halogenated hydrocarbon solvents include 1,1,1-trichloroethane, trichloroethylene and perchloroethylene.

The present invention will be illustrated with reference to the following examples.

EXAMPLE 1

Using a dye complex consisting of a dye defined as C.I. Acid Orange 7 (C.I. 15510) and γ-octoxypropylamine, a dye bath was prepared so that the concentration based on the free dye was 1 percent o.w.f., the amount of water added was 0.2 percent by weight and the liquor ratio was 1 : 75. The term "free dye" means a dye component of a dye complex. Wool (water content 12 percent o.w.f.) was dyed in the dye bath at 92°C for 1 hr. About 20 minutes after dyeing was started, an exhaustion equilibrium reached 97 percent and the dyed material obtained had a clear orange shade with good levelness. When well-known long-chain alkylamines containing no oxygen atom such as dodecylamine, octadecylamine, 1-cyclohexylaminopropylamine, 4-dodecylaniline, N,N-dimethylhexadecylamine or N-dodecylmorpholine were employed, a desirable result could not be obtained due to a lower degree of exhaustion of the corresponding dyes. Furthermore, when well-known amines having a relatively small number of carbon atoms in the alkyl residue containing an ethereal oxygen atom, e.g., methoxypropylamine or N-methoxypropyl-N-benzylamine, were employed, the dye bath was poorly emulsified and thus level dyeing could not be obtained.

EXAMPLE 2

Dyeing was carried out as described in Example 1 except that a dye defined as C.I. Acid Red 6 (C.I. 14680) was employed in place of the dye employed in Example 1, and a red shade with the same good levelness was obtained.

EXAMPLE 3

Dyeing was carried out as described in Example 1 except that a dye defined as C.I. Acid Blue 126 was employed in place of the dye employed in Example 1, and a blue shade with the same good levelness was obtained.

EXAMPLE 4

Using a dye complex consisting of a dye defined as C.I. Acid Blue 62 (C.I. 62045) and β-decyloxyethylamine, a dye bath was prepared so that the concentration based on the free dye was 1 % o.w.f. and the liquor ratio was 1 : 75. Nylon (water content 3.3% o.w.f.) was dyed at 92°C for 120 minutes in the dye bath. The degree of exhaustion reached about 98 % and a clear blue shade with an extremely high levelness was obtained.

When well-known long-chain alkylamines containing no oxygen atom, e.g., dodecylamine or octadecylamine, were employed, the degree of exhaustion of the corresponding dyes was low and thus a desirable result could not be obtained.

EXAMPLE 5

When a dye defined as C.I. Acid Red 85 (C.I. 22245) was employed in place of the dye as described in Example 4, a red shade with the same good levelness was obtained.

EXAMPLE 6

Using a dye complex consisting of a dye defined as C.I. Acid Blue 126 and γ-(β'-decyloxyethoxy)-propylamine, dyeing was carried out as described in Example 1 and a blue shade with the same good levelness was obtained.

What we claim is:

1. A process for dyeing a nitrogen-containing fiber selected from wool, silk, nylon and modified polyesters, which comprises dyeing the fiber in a dye bath containing a halogenated hydrocarbon solvent selected from 1,1,1-trichloroethane, trichloroethylene and perchloroethylene and a dye complex of an anionic dye selected from azo, anthraquinone, triphenylmethane and phthalocyanine dyes which are water-soluble and contain at least one radical selected from ionic and polar radicals with an amine of the formula:

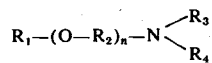

wherein $R_1$ represents a saturated or unsaturated hydrocarbon residue having 8 to 22 carbon atoms, $R_2$ represents a saturated or unsaturated divalent hydrocarbon residue having 2 to 6 carbon atoms, said hydrocarbon residue for $R_1$ and $R_2$ may be of a straight or branched chain, $n$ represents an integer of 1 to 4, and each member of $R_2$ may be the same or different when $n$ is 2 or more, $R_3$ and $R_4$ each represent a hydrogen atom, a lower alkyl or hydroxyalkyl group having 1 to 3 carbon atoms, and $R_3$ and $R_4$ may be the same or different.

2. The process according to claim 1, in which said amine containing an alkyl group of $C_8$ to $C_{14}$ as $R_1$ of the formula as described in claim 1.

3. The process according to claim 1, in which said amine contains an alkylene group of $C_2$ to $C_3$ as $R_2$ of the formula as described in claim 1.

4. The process according to claim 1, in which said amine is selected from the group consisting of γ-octoxypropylamine, β-decyloxyethylamine, β-dodecyloxyethylamine, γ-octadecyloxypropylamine, N,N-dimethyl-β-octoxyethylamine and γ-(β'-decyloxyethoxy)-propylamine.

5. The process according to claim 1, in which a liquor ratio is 1 : 10 – 80.

6. The process according to claim 1, in which the dyeing temperature is 80°–100°C.

7. The process according to claim 1, in which said halogenated hydrocarbon solvent is a chlorinated hydrocarbon solvent.

8. The process according to claim 1, in which the dyeing is carried out in the presence of 0.1 – 5 percent by weight based on the halogenated hydrocarbon solvent of water.

9. The process according to claim 1, in which said nitrogen-containing fiber is a natural fiber or a synthetic fiber.

10. A synthetic and natural nitrogen-containing fiber dyed by the process as described in claim 1.

* * * * *